(12) United States Patent
Schmidt et al.

(10) Patent No.: US 9,278,418 B2
(45) Date of Patent: Mar. 8, 2016

(54) DEVICE FOR SUPPLYING A LIQUID COOLING LUBRICANT TO A CUTTING EDGE OF A LATHE TOOL

(71) Applicant: Satisloh AG, Baar (CH)

(72) Inventors: Philipp Schmidt, Wetzlar/Blasbach (DE); Steffen Wallendorf, Wetzlar-Dutenhofen (DE)

(73) Assignee: Satisloh AG, Baar (CH)

( * ) Notice: Subject to any disclaimer, the term of this patent is extended or adjusted under 35 U.S.C. 154(b) by 0 days.

(21) Appl. No.: 14/300,295

(22) Filed: Jun. 10, 2014

(65) Prior Publication Data

US 2014/0366692 A1    Dec. 18, 2014

(30) Foreign Application Priority Data

Jun. 12, 2013   (EP) .................................... 13002994

(51) Int. Cl.
| | |
|---|---|
| *B23Q 11/00* | (2006.01) |
| *B23B 27/10* | (2006.01) |
| *B23Q 11/10* | (2006.01) |
| *B24B 13/04* | (2006.01) |
| *B24B 55/02* | (2006.01) |
| *B23B 25/00* | (2006.01) |

(52) U.S. Cl.
CPC ................ *B23Q 11/10* (2013.01); *B23B 25/00* (2013.01); *B23B 27/10* (2013.01); *B23Q 11/1023* (2013.01); *B24B 13/046* (2013.01); *B24B 55/02* (2013.01); *B23B 2250/12* (2013.01); *B23Q 2230/004* (2013.01); *Y10T 82/2572* (2015.01)

(58) Field of Classification Search
CPC ........... B23Q 11/1015; B23Q 11/1038; B23B 2250/12
USPC .................................................. 82/50; 407/11
See application file for complete search history.

(56) References Cited

U.S. PATENT DOCUMENTS 2,929,566 A * 3/1960 Paasche ........................ 239/273
2,940,473 A * 6/1960 Smith ............................ 137/883

(Continued)

FOREIGN PATENT DOCUMENTS

DE   10 2010 038 145 A1   4/2011
EP        0 167 063 A1    1/1986

OTHER PUBLICATIONS

VFT-compact-pro, Generating All-Format™ Lens Surfaces with High Performance Fast Tool Technology, satisloh, Jul. 4, 2012, 4 pages.

(Continued)

*Primary Examiner* — Will Fridie, Jr.
(74) *Attorney, Agent, or Firm* — Reising Ethington P.C.

(57) ABSTRACT

A device for supplying a liquid cooling lubricant to a cutting edge of a lathe tool is operatively connected with a fast-tool servo by way of a tool holder in order to be able to execute oscillating movements in an advance direction in common with the tool holder. A first connection is stationary with respect to a housing of the fast-tool servo, for a cooling lubricant source and an outlet, which is in fluid connection with the first connection, for delivery of a cooling lubricant jet to the lathe tool. The outlet is provided at the tool holder and is in fluid connection with the first connection by way of a hose portion so that the cooling lubricant jet delivered via the outlet always impinges at a predetermined point on the cutting edge of the lathe tool even when stroke movements of the tool holder take place.

21 Claims, 6 Drawing Sheets

(56) References Cited

U.S. PATENT DOCUMENTS

| | | | |
|---|---|---|---|
| 3,230,802 A * | 1/1966 | Johnson | 82/158 |
| 3,342,086 A * | 9/1967 | Borman et al. | 408/59 |
| 4,095,916 A * | 6/1978 | Hammond | 408/1 R |
| 4,320,999 A * | 3/1982 | Briese | 409/136 |
| 4,708,539 A * | 11/1987 | Threadgill | 408/61 |
| 4,791,840 A * | 12/1988 | De Rosier et al. | 82/1.11 |
| 5,190,421 A * | 3/1993 | Wen et al. | 408/56 |
| 5,388,487 A * | 2/1995 | Danielsen | 82/158 |
| 6,237,452 B1 | 5/2001 | Ludwick et al. | |
| 6,299,388 B1 * | 10/2001 | Slabe | 407/11 |
| 7,036,408 B2 | 5/2006 | Savoie et al. | |
| 7,440,814 B2 | 10/2008 | McPherson et al. | |
| 7,597,033 B2 | 10/2009 | Savoie et al. | |
| 8,056,453 B2 | 11/2011 | Savoie | |
| 8,074,542 B2 * | 12/2011 | Zwara et al. | 82/50 |
| 2001/0007215 A1 * | 7/2001 | Murata et al. | 83/16 |
| 2002/0127067 A1 * | 9/2002 | Lagerberg | 407/11 |
| 2007/0283794 A1 | 12/2007 | Giannetti | |

OTHER PUBLICATIONS

EP Search Report, European Patent Office, Application No. 13002994.5-1702, Satisloh GmbH, mailed Nov. 25, 2013, 7 pages.

* cited by examiner

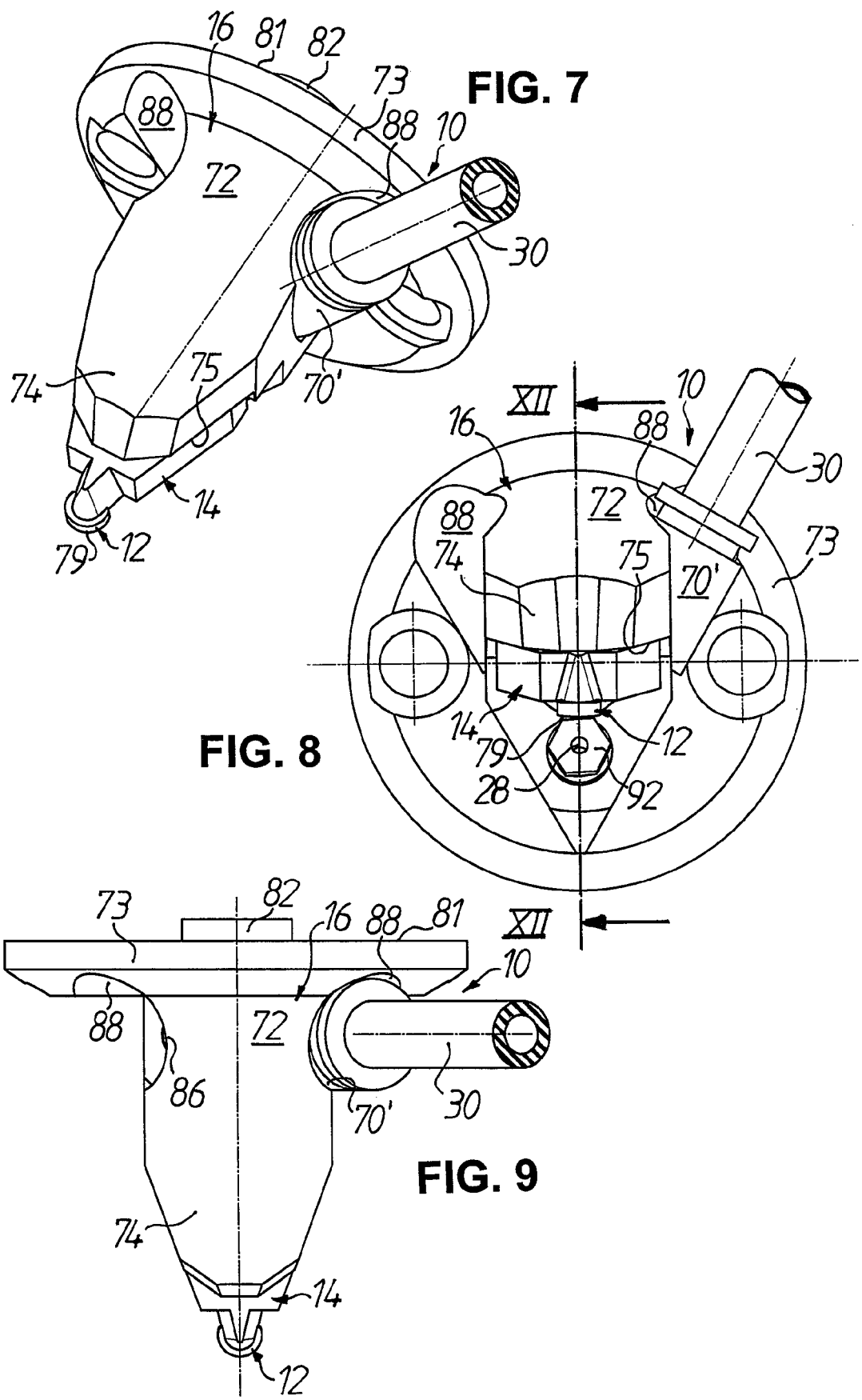

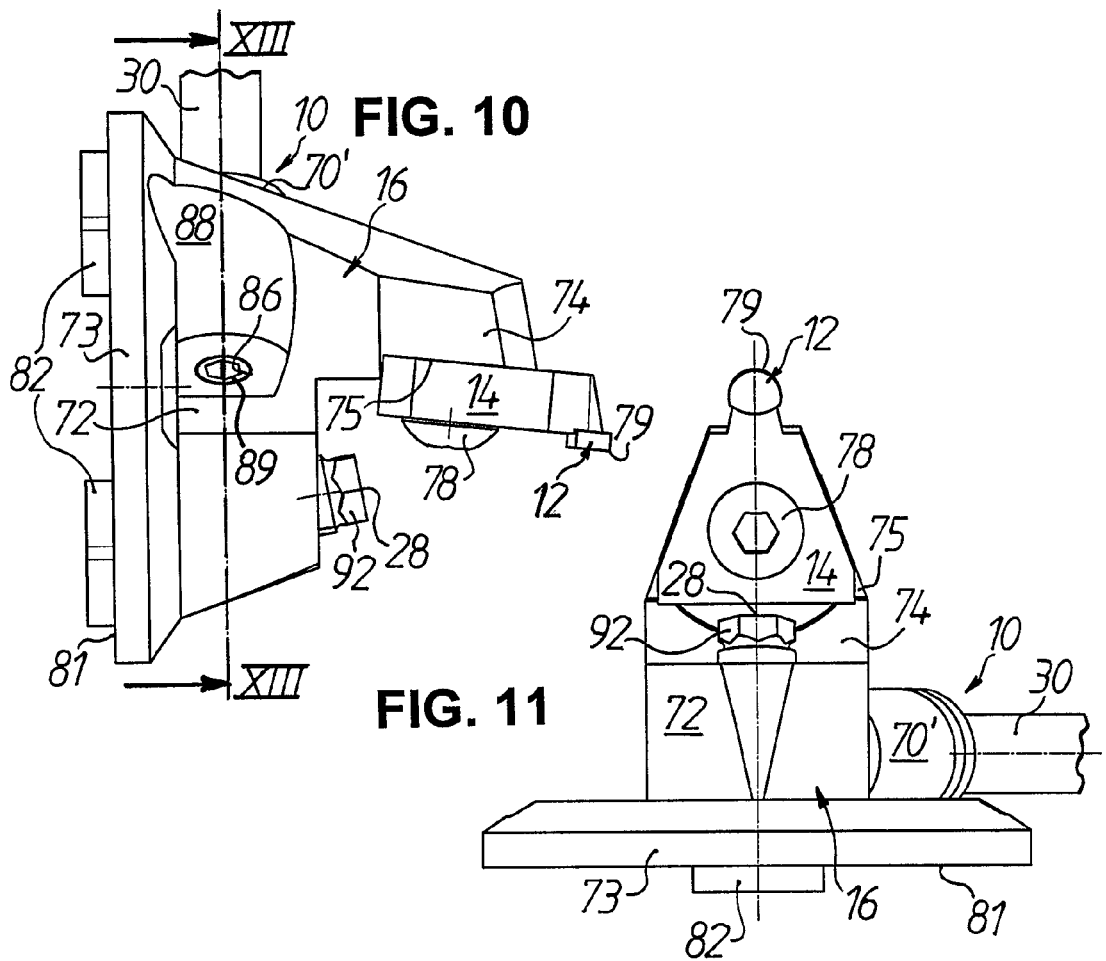
FIG. 10
FIG. 11
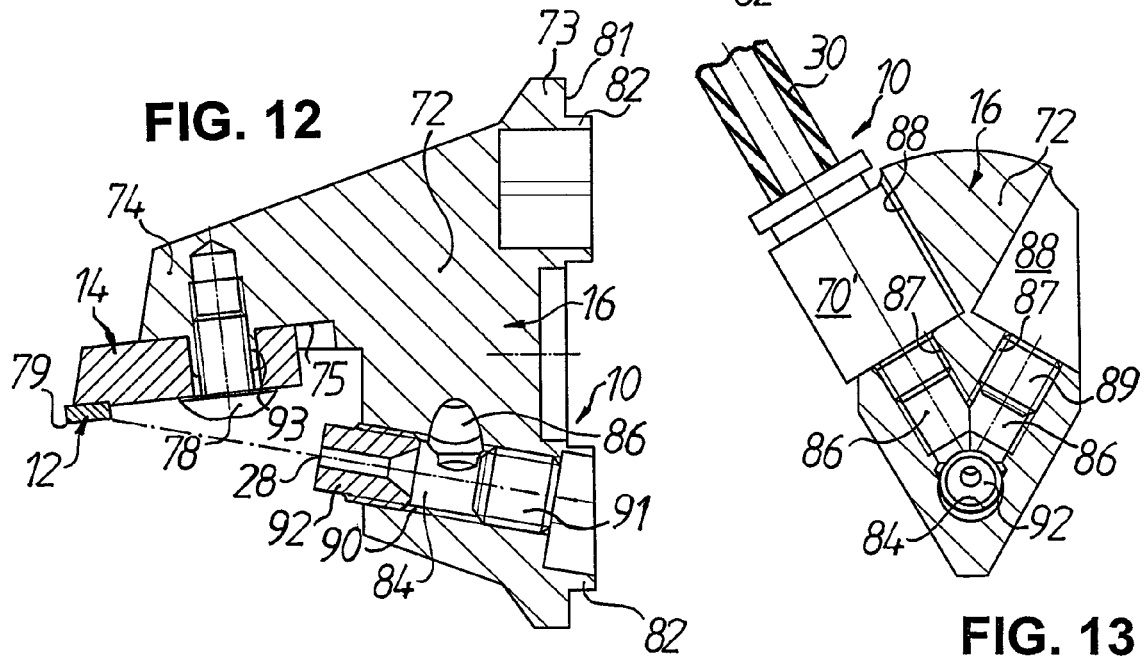
FIG. 12
FIG. 13

DEVICE FOR SUPPLYING A LIQUID COOLING LUBRICANT TO A CUTTING EDGE OF A LATHE TOOL

TECHNICAL FIELD

The present invention relates to a device for supplying a liquid cooling lubricant to a cutting edge of a lathe tool, which is operatively connected by way of a tool holder with a fast-tool servo so as to be able to execute oscillating movements in an advance direction in common with the tool holder. In particular, the invention relates to a cooling lubricant feed or supply device such as is widely used at a fast-tool lathe machine for processing plastics material spectacle lenses in production facilities for manufacturing individual spectacle lenses to prescription.

BACKGROUND OF THE INVENTION

Usually, in the processing of plastics material spectacle lenses a spectacle lens blank, commonly referred to only as a "blank", is provided which has a standardized, finished convex outer surface with, for example, a spherical or progressive shape and which is molded from plastics material (for example polycarbonate, CR 39, HI-Index, etc.). The inner or prescription surfaces, which are usually concave, are machined to provide a spherical, aspherical, toroidal, atoroidal, progressive or freely shaped geometry (varifocal surface) depending on the respectively desired optical effect. The typical conventional sequence for inner surface processing provides, after blocking of the spectacle lens blank by its outer surface on a block member, optionally a processing by milling and, particularly, turning for production of the optically active shape, usually followed by a fine grinding or polishing process for attainment of the necessary surface quality.

In the prior art, use is also made for the above-mentioned turning process of so-called fast-tool lathes in which a lathe chisel can be moved highly dynamically either in linear reciprocation (See, for example, specification WO-A-02/06005) or in rotation (See for example, specification WO-A-99/33611) so that lens surfaces which are not rotationally symmetrical or are 'non-round' can be produced in the turning process. The actual turning, i.e. the cutting process, in that case is carried out with supply of a liquid cooling lubricant to the cutting edge of the lathe tool. On the one hand the cooling lubricant has to cool and lubricate at the cutting location so as to prolong the service life of the lathe tool and to assist the advance and on the other hand the cooling lubricant has to ensure optimum removal of chips and in that case also bind fine material particles, which have arisen during the cutting and which in the case of dry processing would, due to their size, pass as dust and possibly place the health of the user at risk.

In the prior art, a liquid cooling lubricant is commonly supplied to the cutting edge of the lathe tool at a fast-tool lathe through segmented hose systems for example the Loc-Line® Flexi System of Lockwood Products, Inc., Lake Oswego, Oreg., USA (cf. specification EP-A-0 167 063); see, for example, the brochure, "VFT-compact-pro" of Satisloh AG, Baar, Switzerland on page 1 (small illustration: orange-colored segmented hose above the lathe chisel). These segmented hoses have individual specially shaped, stiff plastics material segments, of which several are plugged together to form a segmented hose of predetermined length. Because of the stiffness, 'segment pipe' would be a better term for these systems. The individual plastics material segments are then pivotably interconnected, yet with positional stability, so that the segmented hose can be oriented with respect to the lathe chisel. At the inlet end the segmented hose is coupled to a connection, which is stationary with respect to a housing of the fast-tool servo and which can be supplied with the cooling lubricant from a cooling lubricant source. At the outlet end the segment hose is usually provided with a nozzle segment forming an outlet, which is in fluid connection by way of the segmented hose with the connection at the housing side, for delivery of a cooling lubricant jet to the lathe chisel.

These segmented hoses are indeed simple to align, by a grip, to any desired position, in which they also remain with a high degree of vibration insensitivity and positional stability. However, the cutting edge of the lathe chisel driven by way of the fast-tool servo moves highly dynamically, in the case of turning of non-round lens surfaces over a total stroke of at most approximately 30 millimeters, for example oscillating at up to 200 Hz or more, over a processing stroke of at most approximately 10 to 12 millimeters below the cooling lubricant jet delivered by the stationary segmented hose, so that the cooling lubricant jet is not always directed in the best possible manner onto the location of the cutting. Different thicknesses and curvatures of the spectacle lens to be processed additionally require a re-arrangement of the segmented hose system or a widely fanned cooling lubricant jet, which for the most part does not impinge on the point of action of the lathe chisel.

What is needed is a device of simplest possible construction for the feed of liquid cooling lubricant to a cutting edge of a lathe tool drivable in oscillation by a fast-tool servo, which device reliably ensures that the cooling lubricant always reaches, in the best possible way, the location of the cutting.

SUMMARY OF THE INVENTION

According to one embodiment of the invention, a device for supplying a liquid cooling lubricant to a cutting edge of a lathe tool is operatively connected by way of a tool holder with a fast-tool servo in order to be able to execute oscillating movements in an advance direction together with the tool holder. The device has a first connection, which is stationary with respect to a housing of the fast-tool servo, for a cooling lubricant source and an outlet, which is in fluid connection with the first connection, for delivery of a cooling lubricant jet to the lathe tool. The outlet is provided at the tool holder and is in fluid connection with the first connection by way of a hose portion or length that is flexible.

Since the outlet of the cooling lubricant feed device is provided at the tool holder the cooling lubricant jet can be directed to one and the same location of the lathe cutting edge so that the cooling lubricant always passes in optimum manner to the cutting zone and, in particular, even while the fast-tool servo highly dynamically moves the lathe cutting edge. In this case the flexible hose portion follows the oscillatory motions of the tool holder and always ensures a supply of the cooling lubricant. It is preferred that the hose portion is also resilient.

As a result, problems caused by insufficient or imprecise cooling lubricant supply, particularly during the turning of plastics material spectacle lenses, are reliably avoided and indeed regardless of the thickness and curvature of the respective spectacle lens to be processed and without needing for this purpose any time-consuming equipping or aligning processes such as in the case of the above described segmented hose systems.

Tests carried out by the applicant have shown that the integrated cooling lubricant supply according to the invention has a very positive effect on the entire turning process, not only with respect to improved surface quality and processing reliability, but also with respect to improved discharge of chips. This in turn brings with it advantages for the downstream polishing process. Since not only surface roughness, but also kinematic roughness and depth of edge zone damage are less, a smaller amount of material has to be polished away so that the downstream polishing process can be shortened. By virtue of the optimized cooling/lubricating of the workpiece in the immediate processing zone, friction and thus also wear of the lathe tool are reduced, while at the same time high temperatures and accompanying material damage in the workpiece are avoided. In addition, a controlled chip breakage, particularly in the case of materials with a tendency to chip flow such as polycarbonate or in the case of Trivex® lenses, is promoted.

Moreover, it is evident therefrom that the optimized cooling lubricant supply also has a positive effect on processing forces. Since aerostatically mounted workpiece spindles, which have a relatively low stiffness, are often used in fast-tool lathes, reduction of the cutting forces accompanying optimized cooling/lubrication has an advantageous effect particularly in the lens center. The turning of spectacle lenses is fundamentally problematic in the region of the lens center, since here the cutting speed approaches zero. Consequently, relatively high axial forces emanate from the lathe tool and act on the tool spindle by way of the spectacle lens. The lathe tool in this region of the spectacle lens presses more than it cuts. Due to the resulting deflection of the comparatively soft workpiece spindle so-called 'center features', i.e. small elevations in the region of the lens axis or optical axis, can occur as a consequence. These undesired defects or topographical faults can also be significantly reduced by the lower cutting forces, which are attributable to cooling lubricant feed, in accordance with the invention. Since these local surface faults cannot, particularly in the case of use of flexible polishing tools, be fully smoothed, the cooling lubricant feed according to the invention also to that extent has a particularly positive effect on the downstream process of polishing. Through reduction of the processing forces as a consequence of improved cooling lubricant supply and chip discharge also the forces exerted in radial direction on the spectacle lens and workpiece spindle as well as yielding of the workpiece spindle are less noticeable, so that in total an improved effect with respect to kinematic roughness and a lens surface corresponding more precisely overall with the desired topography can be expected.

In principle, it is possible to mount a nozzle or the like, which forms the outlet for delivery of the cooling lubricant jet and with which the resilient hose portion is connected, in suitable manner externally on the tool holder. With respect to avoidance of additional parts and to smaller moved masses as well as the contamination issue it is, however, preferred if the outlet is formed by at least one nozzle channel in the tool holder, which channel communicates with a distributor bore in the tool holder in which a second connection for the resilient hose portion is attached. In an advantageous embodiment the nozzle channel is then aligned by its center axis with respect to an active cutting region of the cutting edge.

The nozzle channel may have its geometry be in correspondence with the respective feed requirements. For example, the nozzle may be slot-shaped for delivering a fan-shaped cooling lubricant jet, or extend conically for jet focusing in the case of a suitable multi-part construction of the tool holder. However, with respect to simple capability of production, drilling of a cylindrical nozzle is preferred.

Moreover, the arrangement can be such that at least two nozzle channels are provided in the tool holder, which extend convergently towards one another with respect to an active cutting region of the cutting edge. Through appropriate alignment of the nozzle channels a larger active cutting region of the lathe cutting edge can thus be washed or wetted with the cooling lubricant, which is of advantage particularly when it is necessary to process workpiece geometries in which the point of action between lathe cutting edge and workpiece migrates relatively appreciably along the lathe cutting edge.

In addition, particularly with respect to simple capability of production and a compact arrangement it is preferred if the distributor bore is a blind bore extending substantially transversely to the advance direction. The second connection for the hose portion can thus advantageously be mounted laterally at the tool holder.

In principle, it is possible with suitable selection of hose material to keep the hose portion so short that in the case of stroke movement of the tool holder with respect to the housing of the fast-tool servo it is resiliently lengthened in the axial direction. However, a design in which the hose portion is longer than the largest clear spacing at maximum stroke of the tool holder between the first connection and the second connection and extends therebetween in curved shape, for example C-shaped or U-shaped, is preferred. The hose portion in the case of stroke movements of the tool holder thus encounters only bending and, in some cases, torsion, which increases service life of the hose portion and also causes less resistance to the stroke movements of the tool holder. The resilient nature of the hose portion promotes the hose to return to a normal position.

Moreover, the first and/or second connection may be a push-in fitting, which are commonly commercially available easily assembled and inexpensive. This can be constructed as a straight or L-shaped push-in fitting in correspondence with the respective installation requirements. Push-in fittings of that kind advantageously enable a very rapid change of the resilient hose portion.

In addition, two distributor bores can be constructed in the tool holder on opposite sides of the tool holder with respect to the cutting edge of the lathe tool as seen in a direction transverse to the advance direction end. The second connection for the resilient hose portion is attached at the end of one distributor bore. The other distributor bore is closed at its end by a closure plug or filler plug. In this embodiment of the tool holder the resilient hose portion can be selectably connected by one or the other end to the respective distributor bore. The respective other distributor bore is simply closed, which is of advantage with respect to flexibility of use of the cooling lubricant feed device for the most diverse installation situations. Beyond that, the tool holder, which to that extent is 'free drilled', also has only a very low weight, which is advantageous with regard to lower moved masses.

Further, it is preferred particularly with respect to a design favorable in terms of production engineering if the two distributor bores are arranged to be V-shaped as seen in a section transverse to the advance direction and in that case intersect a common nozzle channel which can be provided in the region of the tip of the V-shaped arrangement.

Finally, the nozzle channel can be provided at the outlet end with an exchangeable nozzle insert. On the one hand this enables simple cleaning of the nozzle channel; possible contaminations or blockages can be easily removed. On the other hand, this allows use of different nozzles with different nozzle geometries corresponding with the respective jet requirements.

BRIEF DESCRIPTION OF THE DRAWINGS

The invention is explained in more detail in the following by way of preferred embodiments with reference to the accompanying, partly simplified or schematic drawings, in which the same reference numerals characterize the same or corresponding parts and in which:

FIG. 7 shows a perspective view of another tool holder for the lathe tool obliquely from the front and above, for illustration of a cooling lubricant feed device illustrating a second embodiment of the invention;

FIG. 8 shows a front view of the tool holder shown in FIG. 7 with parts of the cooling lubricant feed device in accordance with the second embodiment;

FIG. 9 shows a plan view of the tool holder shown in FIG. 7 with a viewing direction from above in FIG. 8;

FIG. 10 shows a side view of the tool holder shown in FIG. 7 with a viewing direction from the left in FIG. 8;

FIG. 11 shows a bottom view of the tool holder shown in FIG. 7 with a viewing direction from below in FIG. 8;

FIG. 12 shows a sectional view of the tool holder shown in FIG. 7 in correspondence with the section line XII-XII in FIG. 8; and FIG. 13 shows a sectional view of the tool holder shown in FIG. 7 in correspondence with the section line XIII-XIII in FIG. 10.

DETAILED DESCRIPTION OF THE EMBODIMENTS

Figure 1:
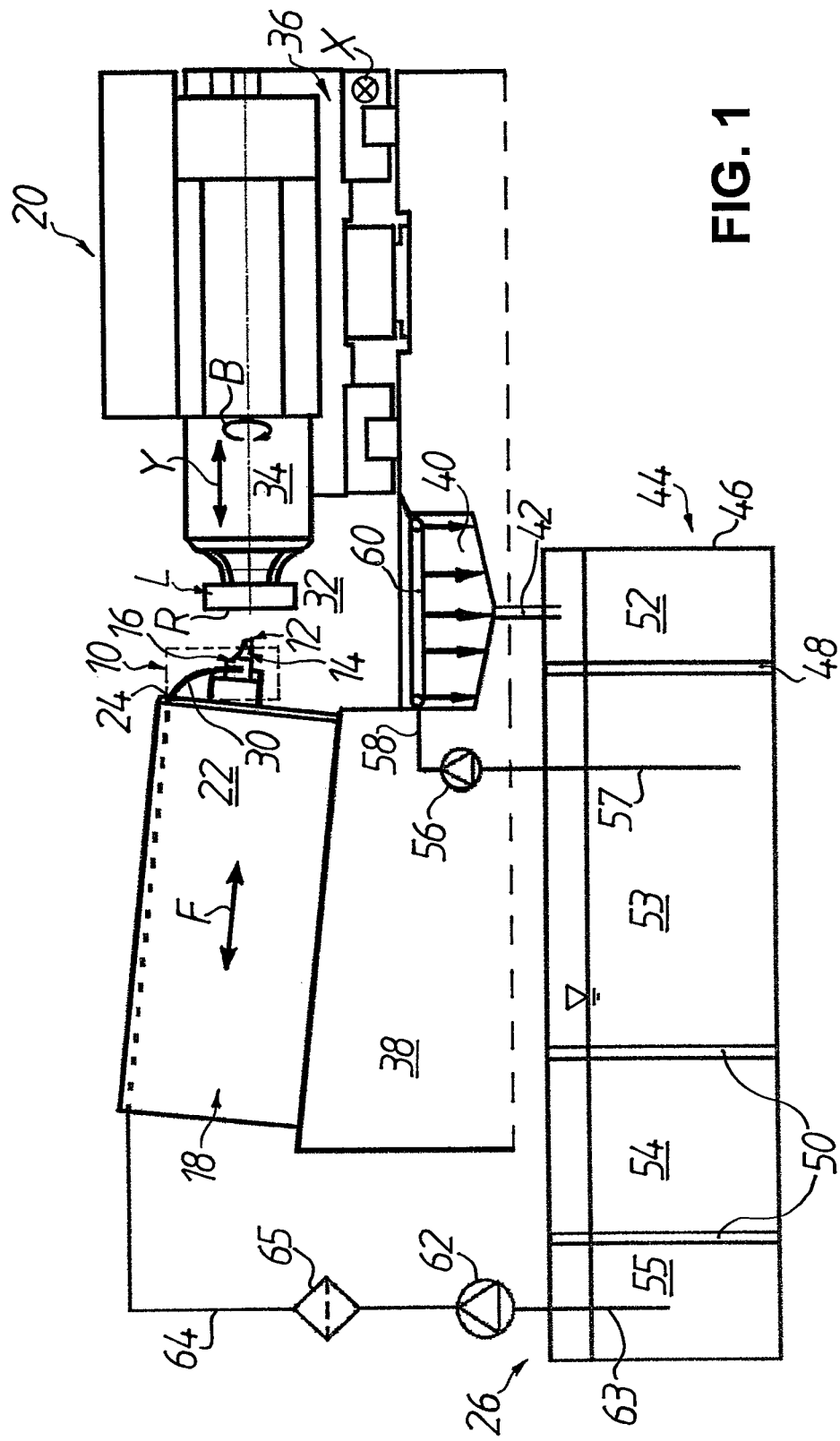
FIG. 1 is a basic front view of a fast-tool lathe for plastics material spectacle lenses, with a cooling lubricant feed device illustrating one embodiment of the invention, which is arranged between a fast-tool servo and a lathe tool driven therefrom and which is connected with a similarly illustrated cooling lubricant source or cooling lubricant supply unit.

FIGS. 1 to 13 illustrate details of two embodiments of a device 10 for supplying a liquid cooling lubricant, which is commonly used in the machining of plastics material spectacle lenses L, to a cutting edge 12 of a lathe chisel or lathe tool 14, which is operatively connected by way of a tool holder 16 with a fast-tool servo 18 of a fast-tool lathe 20 in order to be able to execute oscillating movements in an advance direction (F-axis) in common with the tool holder 16. The cooling lubricant feed device 10 has a first connection 24, which is stationary with respect to a housing 22 of the fast-tool servo 18, for a cooling lubricant source 26 and an outlet 28, which is fluid connection with the first connection 24, for delivery of a cooling lubricant jet to the lathe tool 14. It is significant that the outlet 28 of the cooling lubricant feed device 10 is provided at the tool holder 16 or arranged to be fixed relative to the tool holder and is in fluid connection with the first connection 24 by way of a flexible hose length or portion 30, as is described in more detail in the following, so that the relative position of outlet 28 and cutting edge 12 does not change even when stroke movements of the tool holder 16 take place and the cooling lubricant jet delivered by way of the outlet 28 always impinges on the cutting edge 12 at a predetermined point or in a defined region.

The fast-tool lathe 20 illustrated in FIG. 1 in the form of a diagram which apart from the fast-tool servo 14 can, for lathe processing of the spectacle lens L, also have further processing units such as a milling unit, engraving station, etc., further measuring and testing stations as well as manipulating and transport devices for tools and/or workpieces (all not shown) shall be described here only briefly and to the extent appearing necessary for an understanding of the present invention. Construction and functioning of such a fast-tool lathe 20 is disclosed in U.S. Pat. No. 7,597,033 and incorporation by reference is hereby made.

The fast-tool servo 18 illustrated in FIG. 1 at top left is described in detail in U.S. Pat. No. 8,056,453 and incorporation by reference is hereby made at this point with respect to construction and functioning of the fast-tool servo 18. The fast-tool servo 18 has, in a manner known per se, an actuator, for example a moving coil drive, and an associated carriage, also termed "shuttle" (both not illustrated), which is axially movable by the actuator in both directions of the fast-tool axis F, wherein the position or the stroke of the carriage is controlled by CNC. The tool holder 16 is flange-mounted on the carriage in a manner still to be described.

Arranged on the righthand side opposite the fast-tool servo 18 with respect to a processing region 32 of the fast-tool lathe 20 is a workpiece spindle 34 to which the spectacle lens L can be clamped in a manner known per se for processing of its face-side prescription surface R by the lathe tool 14. The spectacle lens L is rotatable at a rotational speed and rotational angle under CNC control about a workpiece axis of rotation (B-axis) by the workpiece spindle 34. The workpiece spindle 34 itself is adjustable under CNC positional control by a cross-table arrangement 36 on the one hand transversely to the fast-tool servo 18 in both directions of an X-axis and on the other hand on the fast-tool servo 18 towards and away from this in both directions of a Y-axis. The fast-tool servo 18 and the cross-table arrangement 36 for the workpiece spindle 34 are mounted on a machine frame 38 in which a basin-like cuttings chamber 40, into which the chips arising during turning of the spectacle lens L drop or are washed by the cooling lubricant, is provided below the processing region 32.

The cuttings chamber 40 has an outflow 42, which is connected with a cooling lubricant preparation apparatus 44 schematically shown in FIG. 1. The apparatus 44 has a reservoir 46 for receiving the cooling lubricant, which is divided by a sieve 48 and a filter 50 into reservoir regions 52, 53, 54 and 55 of different degrees of purity of the cooling lubricant. Whereas the chips collect in the reservoir region 52 on the right in FIG. 1, the cooling lubricant in the reservoir region 55 on the left in FIG. 1 is free of cuttings, i.e. cleaned and readied. The cooling lubricant preparation apparatus 44 can as is well known to the expert, also include a cuttings press, or centrifuge, and other components and standard accessories for a lubricant preparation apparatus; however, these components are not shown in FIG. 1.

A scavenge pump 56 is connected with the cooling lubricant preparation apparatus 44 between the sieve 48 and the first filter 50 by way of a suction line 57. The pump outlet of the scavenge pump 56 is hydraulically connected with an annular rinsing nozzle section 60, which is mounted at an upper region of the cuttings chamber 40 and which serves for rinsing the cuttings chamber 40 as arrows in FIG. 1 indicate.

A further cooling lubricant pump 62 is associated with the reservoir region 55, which is on the left in FIG. 1, of the reservoir 46 in order to draw cooling lubricant therefrom as a component of the cooling lubricant source 26 shown here by way of a suction line 63 and to feed it by way of a further pressure line 64, which is schematically shown in FIG. 1 and which is illustrated in dashed lines in the fast-tool servo 18, to the first connection 24 of the cooling lubricant feed device 10. In the illustrated embodiment a superfine filter 65 is provided in the pressure line 64 in order to prevent possible blockages in the cooling lubricant feed device 10. Alternatively or additionally, operation here could also be with fresh cooling lubricant, in a given case even fresh water, whereby compensation could also be made for liquid losses.

Figure 2:
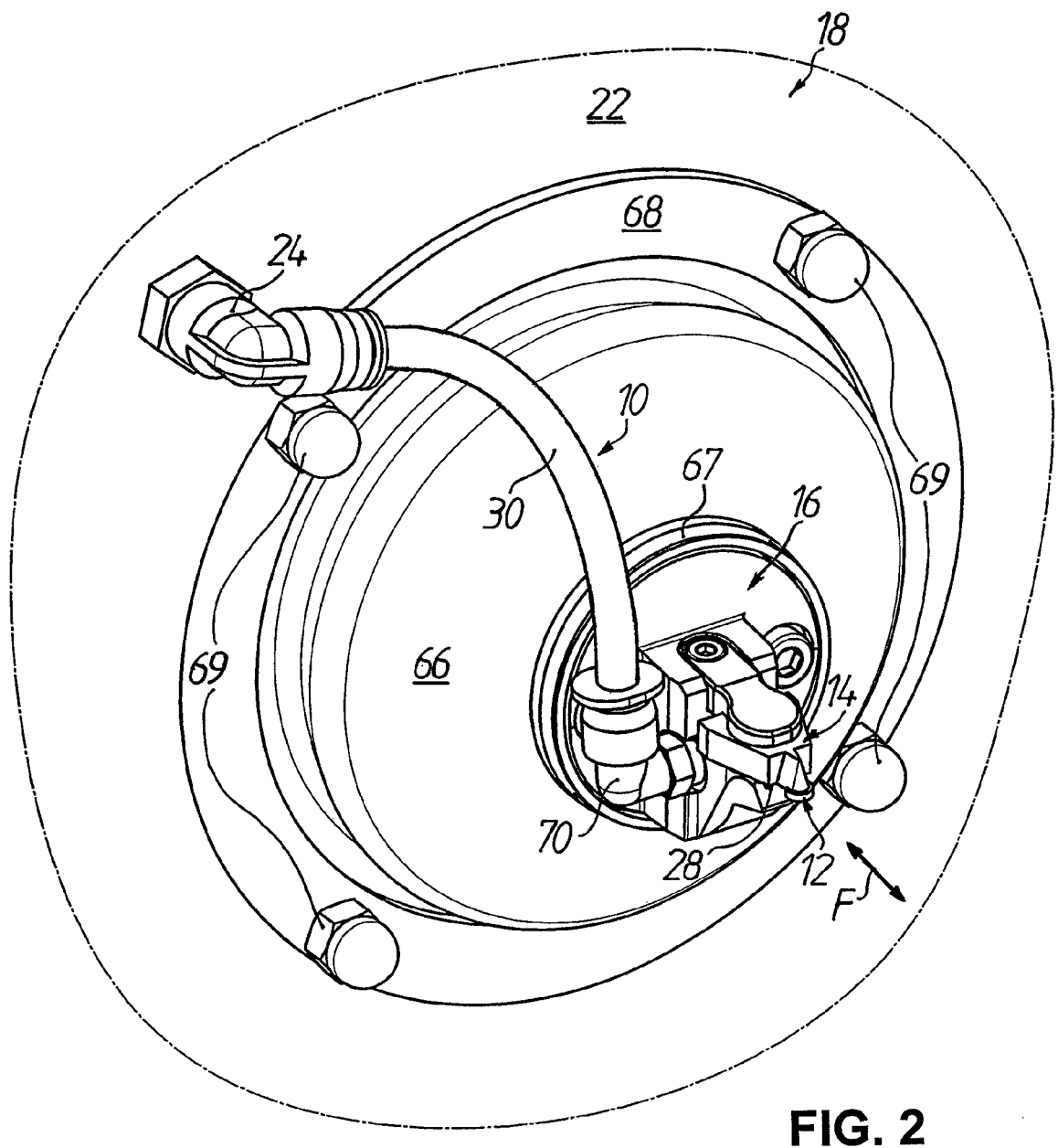
FIG. 2 shows a cut-out perspective view of the fast-tool servo of the fast-tool lathe according to FIG. 1 obliquely from the front and above, on which a tool holder for the lathe tool is mounted, for illustration of further details of the cooling lubricant feed device according to the invention in accordance with a first embodiment.
Figure 3:
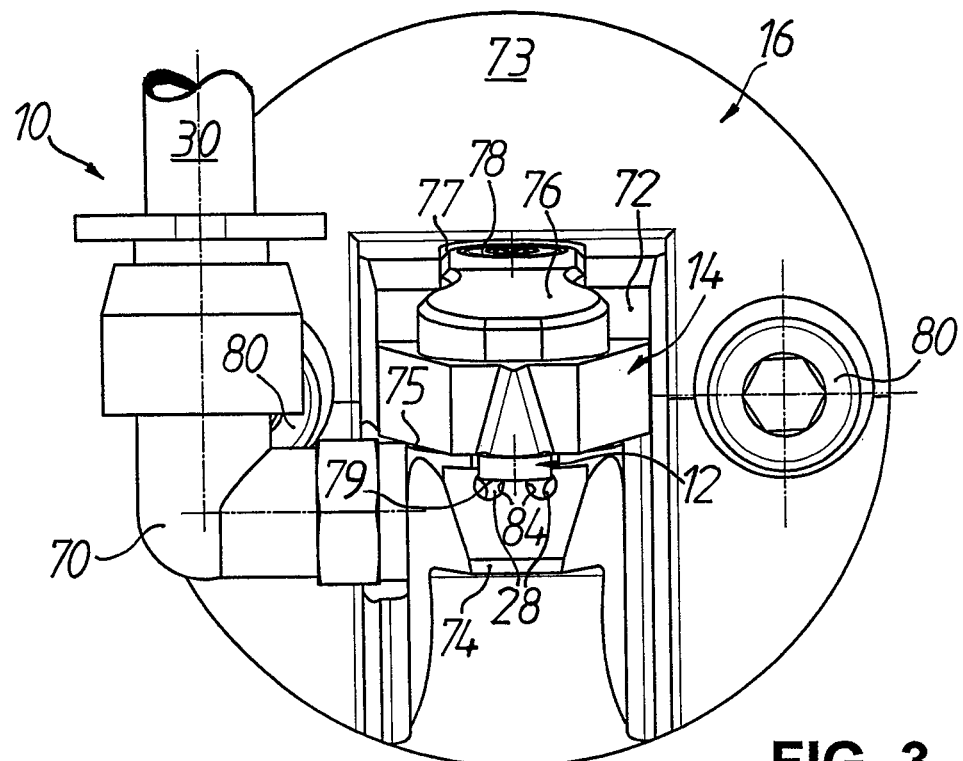
FIG. 3 shows an enlarged front view of the tool holder shown in FIG. 2 with parts of the cooling lubricant feed device shown in FIG. 1.
Figure 4:
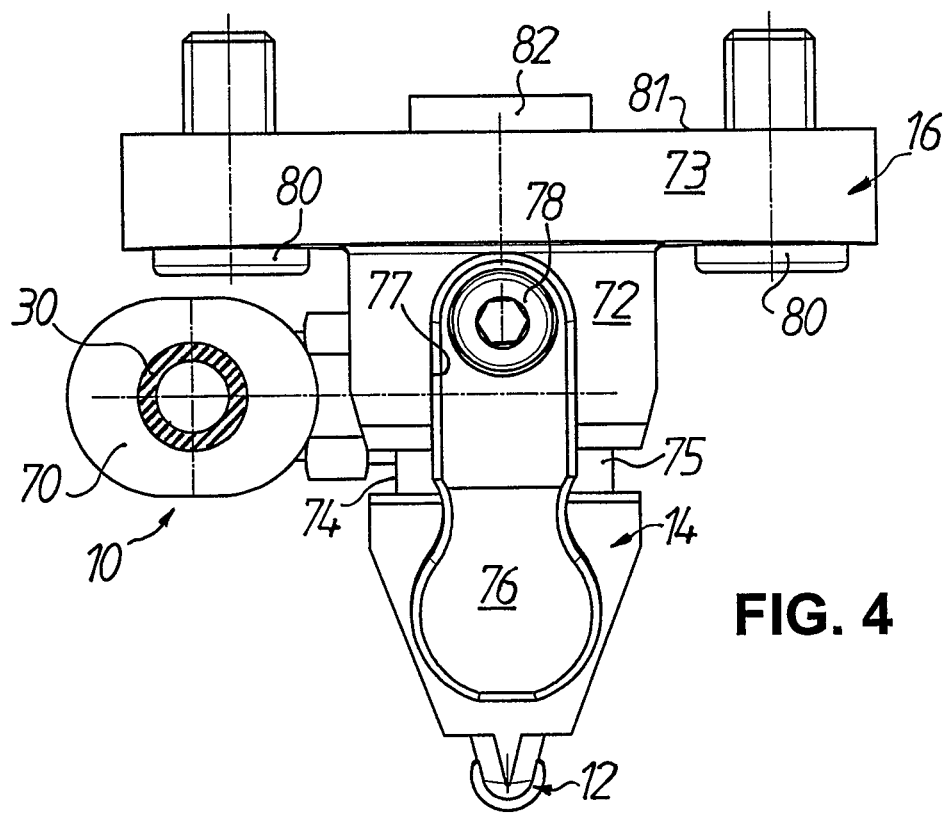
FIG. 4 shows a plan view of the tool holder shown in FIG. 2 with a viewing direction from above in FIG. 3.

Referring now to FIG. 2, the tool holder 16 is mounted in sealed manner on the carriage of the fast-tool servo 18. Provided for this purpose is a bellows 66 which on the one hand is secured by a clamp 67 to the moved tool holder 16 and on the other hand is screw-connected at the end with the stationary housing 22 of the fast-tool servo 18 by a fastening ring 68, threaded studs (not shown) at the housing and cap nuts 69 engaged therewith.

As can also be readily seen in FIG. 2 the resilient hose portion 30 is connected with the tool holder 16 by way of a second connection 70. In that case, the length of the hose is dimensioned so that the flexible hose portion 30 is longer than the greatest distance between the first connection 24 and the second connection 70 which is present when the fast-tool servo 18 is moved out (tool holder 16 in furthest forward setting) and inbetween extends in the form of a curve, so that the hose portion 30 of the cooling lubricant feed device 10 is not resiliently lengthened in the case of stroke movements of the tool holder 16, but is subjected only to an alternating loading in bending and, in a given case, torsion. The hose portion 30 has to withstand these loads as long as possible without damage, whereby relatively high demands are placed on, in particular, repeated flexural strength and kink resistance. Beyond that, the hose portion 30 has to be sufficiently flexible so that it opposes the oscillatory stroke movements of the tool holder 16 with only a smallest possible resistance. The hose portion 30 preferably, is also resilient to bias back to a normal position. It may be resilient in the bending torsion or stretching mode. In addition, the resilient hose portion 30 has to be sufficiently chemically resistant to constituents of conventional cooling lubricants (for example, glycol ethylene and oils). In tests, it has proved that hoses of polyetherpolyurethane such as marketed by, for example, Eisele Pneumatics GmbH+ Co. KG, Waiblingen, Germany under the designation 'ProWeld Typ 99118 (0604) aussenkalibriert' (outer diameter 6 millimeters/inner diameter 4 millimeters) satisfy these requirements very effectively.

The connections 24 and 70 for the resilient hose portion are, in the illustrated embodiment, commercially available push-in fittings. The L-shaped push-in fittings shown here, which are pivotable through 360°, are available, for example, under the designation 'QSM/QSM-B, Quick Star, Mini' with the piece numbers 'ASML-M5-6' and 'QSML-B-M5-6-20' from Festo AG & Co. KG, Esslingen, Germany.

Further details of the tool holder 16 in the case of the cooling lubricant feed device 10 according to the first embodiment can be inferred from FIGS. 3 to 6. The tool holder 16 here has a substantially block-shaped base body 72, with which a flange section 73, which is circularly round as seen in front view (FIG. 3), for fastening of the tool holder 16 to the carriage of the fast-tool servo 18 is connected in the direction of the fast-tool servo 18. On the side of the base body 72 remote from the flange section 73 the former changes into a tongue-shaped bearing section 74, which forms a planar bearing surface 75, which is at the top in FIGS. 3 and 5 and which drops down somewhat in forward direction with respect to the advance direction F, for the lathe tool 14.

In this embodiment the lathe tool 14 is clamped by a clamping claw 76 from above on the bearing surface 75 of the bearing section 74. The clamping claw 76 is in that case seated in a receiving recess 77 of the base body 72 and is screw-connected with the base body 72 in a mode and manner, which is usual for clamping claws, by a clamping screw 78 with a differential thread. The lathe tool 14 can thus be changed in simple manner after releasing the clamping screw 78. The lathe tool 14 is itself known per se; the cutting edge 12 or the cutting lamina, which is mounted thereat optionally detachably or as a coating, forms a cutting edge region 79 as active cutting region and can be made from, in correspondence with the respective requirements, in particular specifically for the material to be processed, of polycrystalline diamond (PCD), CVD, natural diamond or, however, also hard metal with or without a wear-resistant coating. The lathe tool 14 is, finally, also mechanically positively centered on the bearing surface 75 of the bearing section 74; however, the appropriate measures, which are familiar to the one skilled in the art, are not shown here.

The flange section 73 is provided on each of the sides which are diametrically opposite with respect to the base body 72 with a respective continuous, stepped fastening bore which is penetrated by a screw 80, the head of which rests on the step of the bore (not illustrated). These screws 80 are, for mounting the tool holder 16 on the fast-tool servo 18, screwed into associated threaded bores (not shown) in the carriage of the fast-tool servo 18. Finally, provided on the rear side 81 of the tool holder 16 remote from the lathe tool 14 are two guide projections 82 which in a manner known per se serve the purpose of aligning or centering the tool holder 16 with respect to the carriage of the fast-tool servo 18.

Figure 5:
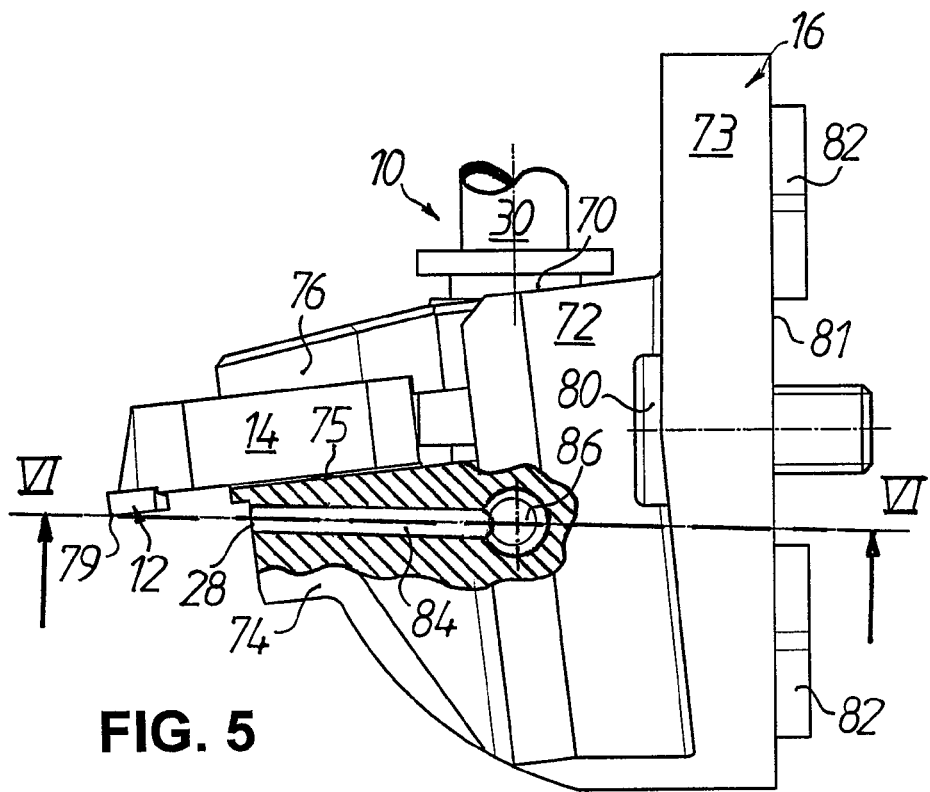
FIG. 5 shows a side view of the tool holder shown in FIG. 2 with a viewing direction from the right in FIG. 3, wherein the tool holder is illustrated broken away along a nozzle channel, which is on the right in FIG. 3, of the cooling lubricant feed device.
Figure 6:
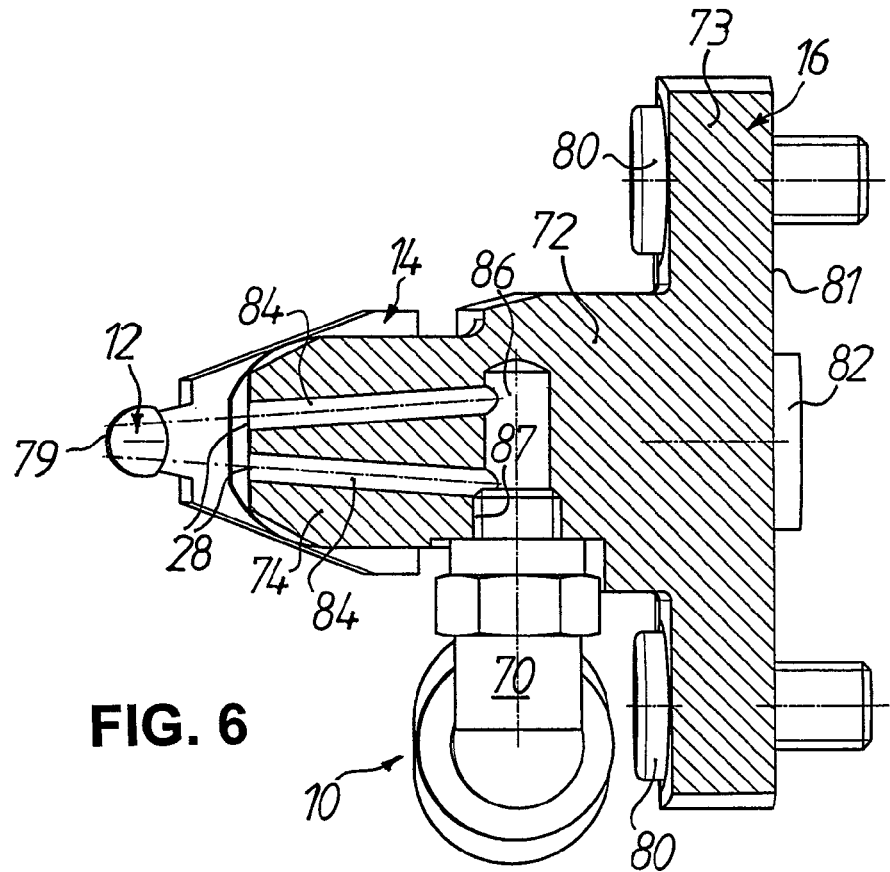
FIG. 6 shows a sectional view of the tool holder shown in FIG. 2 in correspondence with the section line VI-VI in FIG. 5.

As can be seen in the broken-away view according to FIG. 5 and in the section according to FIG. 6 the outlet 28, which is opposite the cutting edge 12 of the lathe tool 14, of the cooling lubricant feed device 10 is formed by at least one nozzle channel 84, in the illustrated embodiment two nozzle channels 84, which here is or are of cylindrical shape and extends or extend through the bearing section 74 of the tool holder 16. The nozzle channels 84 end in and communicate with a distributor bore 86 in the base body 72 of the tool holder 16, in which in accordance with FIG. 6 the second connection 40 for the resilient hose portion 30 is secured, namely screwed into place, for which purpose the distributor bore 86 has a threaded section 87 at its open end. In FIG. 6, it can also be seen that the distributor bore 86 is a blind bore which extends substantially transversely to the advance direction (F-axis). According to FIGS. 5 and 6, the nozzle channels 84 are aligned by the center axes thereof with respect to the active cutting region, which is formed by the cutting edge region 79, of the cutting edge 12 or aimed obliquely from below thereonto. As FIG. 6 further shows, the two nozzle channels 84 in that regard extend convergently towards one another with respect to the active cutting region of the cutting edge 12, so that the curved cutting edge region 79 of the cutting edge 12 is impinged on, washed and cooled over a relatively large angular range by the cooling lubricant jets delivered via the individual nozzle channels 84. This efficient cooling and washing effect in the region of the actual processing zone is independent of the stroke setting of the tool holder 16, because the relative position of the cutting edge 12 with respect to the nozzle channels 84 does not change over the stroke of the fast-tool servo 18.

FIGS. 7 to 13 show a second embodiment of a tool holder 16 in the cooling lubricant feed device 10, which will be explained in the following only to the extent that it significantly differs from the afore-described first embodiment.

In the first instance, the base body 72 of the tool holder 16, which, for example, is made from a stainless steel, in the second embodiment has, by virtue of suitable external shaping, in particular the provision of gable-like chamfers in a lower region (See FIGS. 8 and 13), substantially less material than the base body in the first embodiment, so that here a significantly smaller mass has to be moved by the fast-tool servo 18.

Then, formed in the base body 72 of the tool holder 16 are two distributor bores 86 which end in or open into, as seen in a direction transverse to the feed direction (F-axis), on opposite sides of the tool holder 16 with respect to the cutting edge 12 of the lathe tool 14 in cylindrical recesses 88, which are arranged in mirror image to one another, of the base body 72, as best shown in FIGS. 8, 9 and 13. As can be best seen in FIGS. 8 and 13, the two distributor bores 86 constructed as blind bores just like the recesses 88 are arranged to be V-shaped as seen in a section transverse to the advance direction (F-axis) and intersect at the foot of the V, i.e. in a region of a common nozzle channel 84 which is at the bottom in these figures. The second connection 70' for the resilient hose portion 30 here a straight push-in fitting as is available on the market, for example, under the designation 'QSM, Quick Star, Mini' with the piece number 'QSM-M5-6-I' from Festo AG & Co. KG, Esslingen, Germany is secured to the open end of one distributor bore 86. The other distributor bore 86 is closed at the end by a closure plug 89 screwed into the threaded section 87. It is apparent here that the second connection 70' and the closure plug 89 are interchangeable, so that the resilient hose portion 30 can be connected at either end to the tool holder 16.

The nozzle channel 84 is similarly formed in the base body 72 of the tool holder 16 and, in particular, has an obliquely extending passage bore (See FIG. 12), which is directed or aimed at the cutting edge 12 of the lathe tool 14 and which is provided continuously with an internal thread 90. The lower end, which is at the right in FIG. 12, of the nozzle channel 84 is closed by a blind plug 91 screwed into the internal thread 90. An exchangeable nozzle insert 92 is screwed into the outlet end, which is at the top left in FIG. 12, of the nozzle channel 84. The insert 92 can be formed by, for example, a grub screw which is suitably drilled, for example with a bore diameter of between 1.5 and 3 millimeters. However, it can also here be a commercially available high-pressure nozzle, such as is available on the market, for example, under the designation 'Keramik Hochdruckdüse 078 K M6' of Teschke GmbH, WHD-Shop.de, Duisburg, Germany. It will be apparent to one skilled in the art that in correspondence with the respective jet requirements (pressure, width, height, etc.) the nozzle geometry can differ from the cylindrical geometry shown here, for example the nozzle geometry may be slot-shaped or provided with an oval cross-section.

Finally, it is additionally mentioned with respect to the second embodiment that the lathe tool 14 is differently fastened to the tool holder 16, namely from below to a bearing section 74, which extends upwardly and forwardly away from the base body 72 and which thus directly accepts the processing forces without an interposed clamping claw. In this case, the lathe tool 14 according to FIG. 12 is centered by way of a centering collar 93 at the bearing surface 75 of the bearing section 74 and directly clamped against the bearing surface 75 by a clamping screw 78, for example, a flat tallow-drop screw.

A device for supplying a liquid cooling lubricant to a cutting edge of a lathe tool, which is operatively connected with a fast-tool servo by way of a tool holder in order to be able to execute oscillatory movements in a feed direction in common with the tool holder, has a first connection, which is stationary with respect to a housing of the fast-tool servo, for a cooling lubricant source and an outlet, which is in fluid connection with the first connection, for delivery of a cooling lubricant jet to the lathe tool. The outlet is provided at the tool holder and in fluid connection with the first connection by way of a resilient hose portion, so that the cooling lubricant jet delivered by way of the outlet always impinges at a predetermined point on the cutting edge of the lathe tool even when stroke movements of the tool holder take place.

Variations and modifications are possible without departing from the scope and spirit of the present invention as defined by the appended claims.

The embodiments in which an exclusive property or privilege is claimed are defined as follows:

1. A device for supplying a liquid cooling lubricant to a cutting edge of a lathe tool, which is operatively connected by way of a tool holder with a fast-tool servo so as to be able to execute oscillating movements in an advance direction in common with the tool holder, with a first connection, which is stationary with respect to a housing of the fast-tool servo, for a cooling lubricant source and an outlet, which is in fluid connection with the first connection, for delivery of a cooling lubricant jet to the lathe tool, characterized in that the outlet is provided at the tool holder and is in fluid connection with the first connection by way of a flexible hose portion;
   said outlet is movable with respect to said first connection that is stationary with respect to the housing; and
   the outlet is formed by at least one nozzle channel in the tool holder.

2. A device according to claim 1, characterized in that the nozzle channel communicates with a distributor bore, in which a second connection for the flexible hose portion is secured, in the tool holder.

3. A device according to claim 1 wherein said flexible hose portion is resilient.

4. A device according to claim 3, characterized in that the nozzle channel is aligned by the center axis thereof with respect to an active cutting edge region of the cutting edge.

5. A device according to claim 4, characterized in that the nozzle channel is cylindrical.

6. A device for supplying a liquid cooling lubricant to a cutting edge of a lathe tool, which is operatively connected by way of a tool holder with a fast-tool servo so as to be able to execute oscillating movements in an advance direction in common with the tool holder, with a first connection, which is stationary with respect to a housing of the fast-tool servo, for a cooling lubricant source and an outlet, which is in fluid connection with the first connection, for delivery of a cooling lubricant jet to the lathe tool, characterized in that the outlet is provided at the tool holder and is in fluid connection with the first connection by way of a flexible hose portion;
   wherein said flexible hose portion is resilient;
   the nozzle channel is aligned by the center axis thereof with respect to an active cutting edge region of the cutting edge;
   the nozzle channel is cylindrical; and at least two nozzle channels are provided in the tool holder and extend convergently towards one another with respect to an active cutting edge region of the cutting edge.

7. A device according to claim 6, characterized in that the distributor bore is a blind bore extending substantially transversely to the advance direction.

8. A device according to claim 7, characterized in that the flexible hose portion is longer than the largest distance between the first connection and the second connection and therebetween extends in a curve.

9. A device according to claim 8, characterized in that the first connection and/or the second connection is or are formed by a push-in fitting.

10. A device according to claim 9, characterized in that two distributor bores are provided in the tool holder and as seen in a direction transverse to the advance direction end on sides of the tool holder which are opposite with respect to the cutting edge of the lathe tool, wherein the second connection for the flexible hose portion is attached at the end of one distributor bore, whereas the other distributor bore is closed at the end by a closure plug.

11. A device according to claim 10, characterized in that the two distributor bores are arranged in V-shape as seen in a section transverse to the advance direction and intersect a common nozzle channel.

12. A device according to claim 11, characterized in that the nozzle channel is provided at the outlet end with an exchangeable nozzle insert.

13. A device according to claim 2, characterized in that the nozzle channel is cylindrical.

14. A device for supplying a liquid cooling lubricant to a cutting edge of a lathe tool, which is operatively connected by way of a tool holder with a fast-tool servo so as to be able to execute oscillating movements in an advance direction in common with the tool holder, with a first connection, which is stationary with respect to a housing of the fast-tool servo, for a cooling lubricant source and an outlet, which is in fluid connection with the first connection, for delivery of a cooling lubricant jet to the lathe tool, characterized in that the outlet is provided at the tool holder and is in fluid connection with the first connection by way of a flexible hose portion;
the outlet is formed by at least one nozzle channel in the tool holder, which nozzle channel communicates with a distributor bore, in which a second connection for the flexible hose portion is secured, in the tool holder; and
at least two nozzle channels are provided in the tool holder and extend convergently towards one another with respect to an active cutting edge region of the cutting edge.

15. A device according to claim 2, characterized in that the distributor bore is a blind bore extending substantially transversely to the advance direction.

16. A device according to claim 2, characterized in that the flexible hose portion is longer than the largest distance between the first connection and the second connection and therebetween extends in a curve.

17. A device according to claim 2, characterized in that the first connection and/or the second connection is or are formed by a push-in fitting.

18. A device for supplying a liquid cooling lubricant to a cutting edge of a lathe tool, which is operatively connected by way of a tool holder with a fast-tool servo so as to be able to execute oscillating movements in an advance direction in common with the tool holder, with a first connection, which is stationary with respect to a housing of the fast-tool servo, for a cooling lubricant source and an outlet, which is in fluid connection with the first connection, for delivery of a cooling lubricant jet to the lathe tool, characterized in that the outlet is provided at the tool holder and is in fluid connection with the first connection by way of a flexible hose portion;
the outlet is formed by at least one nozzle channel in the tool holder, which nozzle channel communicates with a distributor bore, in which a second connection for the flexible hose portion is secured, in the tool holder; and
two distributor bores are provided in the tool holder and as seen in a direction transverse to the advance direction end on sides of the tool holder which are opposite with respect to the cutting edge of the lathe tool, wherein the second connection for the flexible hose portion is attached at the end of one distributor bore, whereas the other distributor bore is closed at the end by a closure plug.

19. A device according to claim 18, characterized in that the two distributor bores are arranged in V-shape as seen in a section transverse to the advance direction and intersect a common nozzle channel.

20. A device according to claim 2, characterized in that the nozzle channel is provided at the outlet end with an exchangeable nozzle insert.

21. A device according to claim 14, characterized in that the flexible hose portion is longer than the largest distance between the first connection and the second connection and therebetween extends in a curve.

\* \* \* \* \*